United States Patent
Bauer et al.

(10) Patent No.: US 8,201,849 B2
(45) Date of Patent: Jun. 19, 2012

(54) AGRICULTURAL VEHICLE BALANCING SYSTEM

(75) Inventors: Wolfgang Bauer, Weinheim (DE); Paul R. Smith, Lampertheim (DE)

(73) Assignee: Deere & Company, Moline, IL (US)

( * ) Notice: Subject to any disclaimer, the term of this patent is extended or adjusted under 35 U.S.C. 154(b) by 315 days.

(21) Appl. No.: 12/616,923

(22) Filed: Nov. 12, 2009

(65) Prior Publication Data
US 2010/0117346 A1    May 13, 2010

(30) Foreign Application Priority Data
Nov. 13, 2008  (DE) .......................... 10 2008 043 698

(51) Int. Cl.
*B66C 23/76* (2006.01)
(52) U.S. Cl. ........ 280/758; 280/757; 280/759; 172/611; 212/195; 212/196
(58) Field of Classification Search .......... 280/757–760, 280/763.1, 764.1; 172/611; 212/195, 196; 404/130
See application file for complete search history.

(56) References Cited

U.S. PATENT DOCUMENTS

| | | | | |
|---|---|---|---|---|
| 2,891,681 | A | | 6/1959 | Greivell |
| 3,902,735 | A | * | 9/1975 | Bertram et al. ............. 280/759 |
| 4,081,035 | A | * | 3/1978 | Bowen ......................... 172/484 |
| 4,659,102 | A | * | 4/1987 | Stuhrmann et al. .......... 280/481 |
| 5,156,215 | A | * | 10/1992 | Jensen .......................... 172/611 |
| 5,899,347 | A | * | 5/1999 | Cullity ......................... 212/196 |
| 7,669,898 | B2 | * | 3/2010 | Hamaguchi et al. .......... 280/759 |
| 7,686,097 | B2 | * | 3/2010 | Mozingo et al. .............. 172/450 |
| 7,828,071 | B2 | * | 11/2010 | Breneur et al. ............... 172/439 |
| 2007/0221600 | A1 | * | 9/2007 | Davis ........................... 212/270 |

FOREIGN PATENT DOCUMENTS

| | | | |
|---|---|---|---|
| DE | 4409514 A1 | * | 4/1995 |
| DE | 102005040954 A1 | | 12/2006 |
| EP | 134603 A2 | * | 3/1985 |
| EP | 315595 A2 | * | 5/1989 |

(Continued)

OTHER PUBLICATIONS

Akira Yamanaka, Specially Equipped Car, Aug. 1, 1983, JPO, JP 58-128938 A, English Abstract.* European Search Report (4 pages).

*Primary Examiner* — Faye M Fleming
*Assistant Examiner* — James English

(57) ABSTRACT

A balancing system for an agricultural vehicle includes a balance weight which has take-up pins at its sides. The pins are oriented coaxially to a common pivot axis so that the balancing weight can be taken up by the lower links of a three point implement hitch. When the balance weight has been taken up, it can be moved from a position of the center of gravity (S) of the balance weight close to the vehicle to a position distant from the vehicle. In order to attain a balance as optimal as possible, the position of the center of gravity of the balance weight in its position close to the vehicle is located below the pivot axis. Pivoting devices are provided so that the balance weight can be pivoted about the pivot axis so that it can also be brought from a position close to the vehicle to a position distant from the vehicle, where the balance weight occupies a lower position of the center of gravity in the position close to the vehicle than in the position distant from the vehicle.

4 Claims, 11 Drawing Sheets

FOREIGN PATENT DOCUMENTS

| EP | 2042410 A2 | 4/2009 |
| JP | 58128938 A * | 8/1983 |
| JP | 2000291070 A * | 10/2000 |
| JP | 2003056009 A * | 2/2003 |
| WO | 00/51613 | 9/2000 |
| WO | 02/21898 A1 | 3/2002 |

* cited by examiner

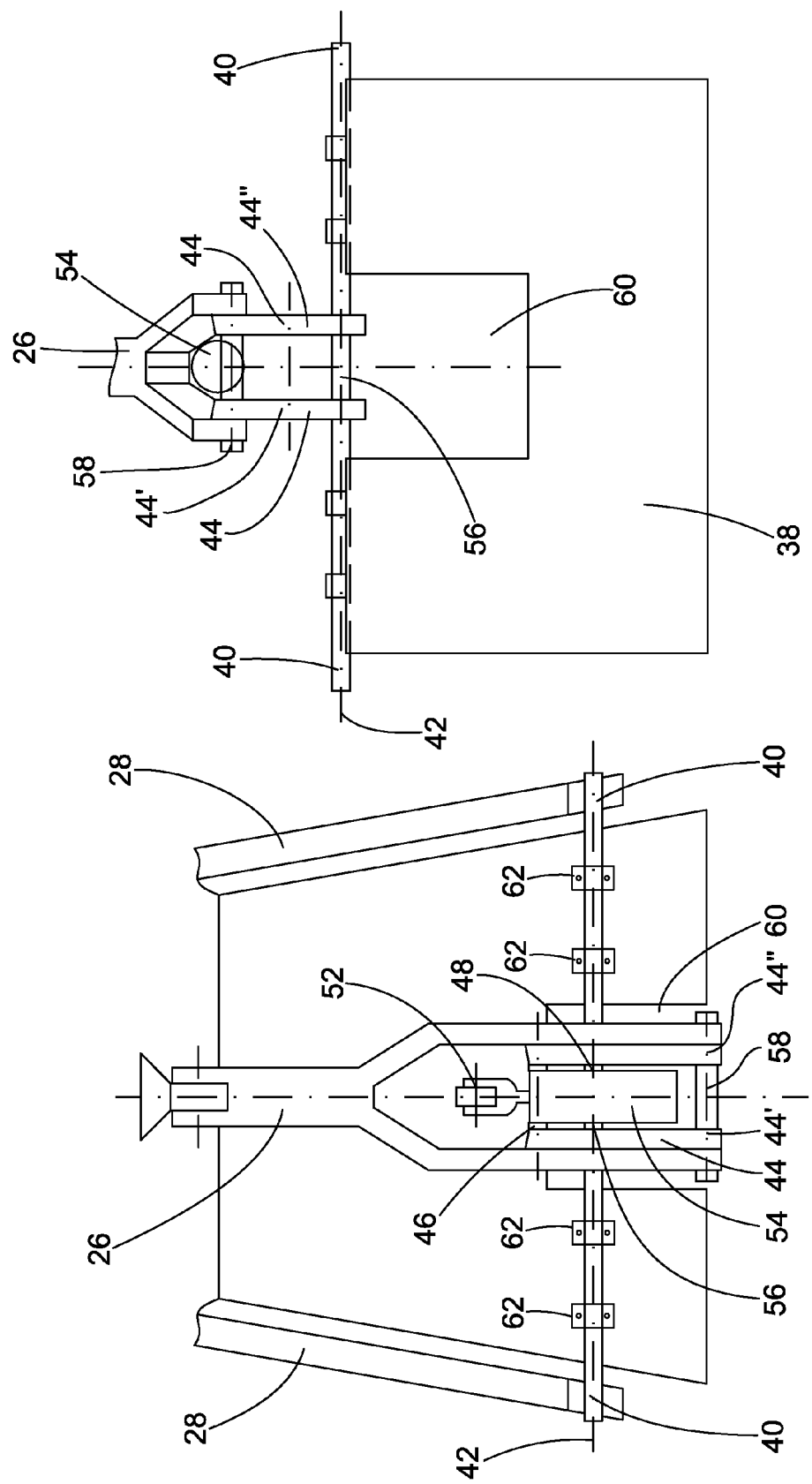

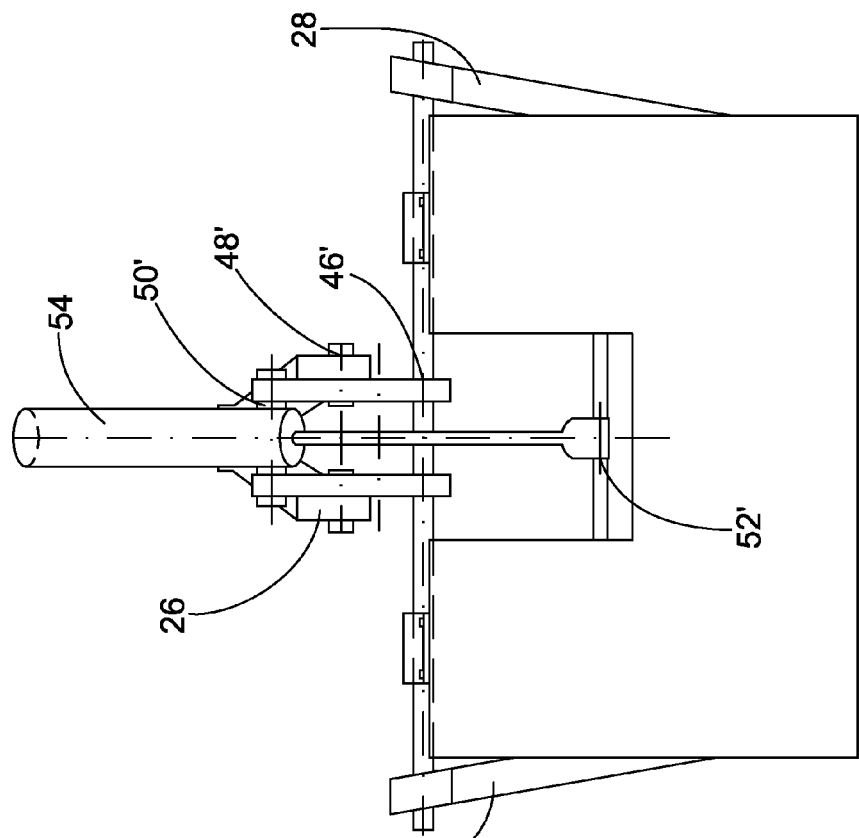
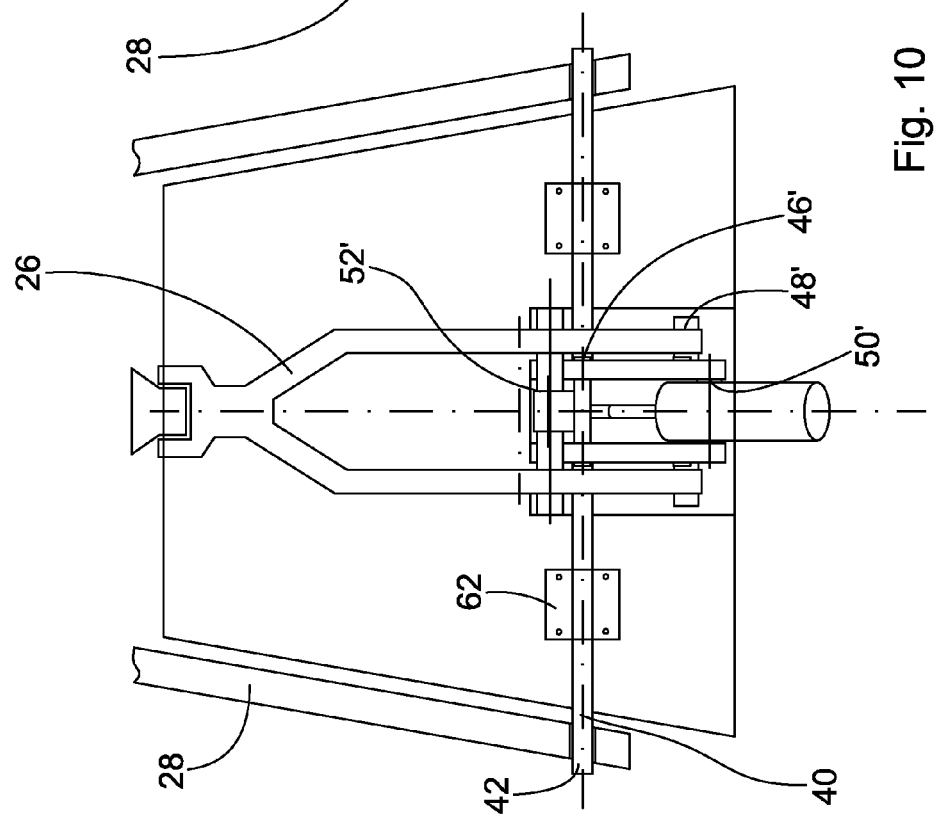

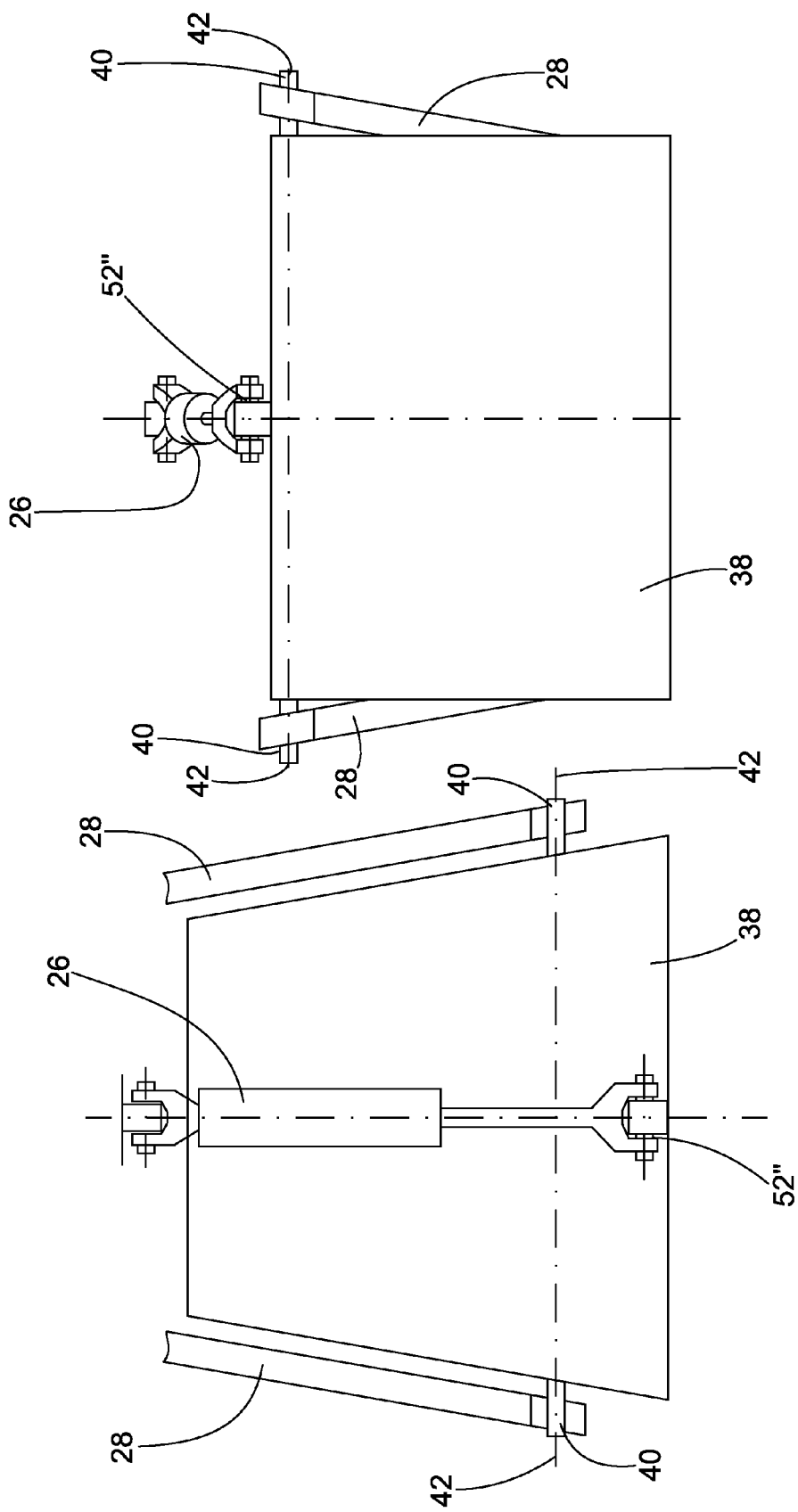

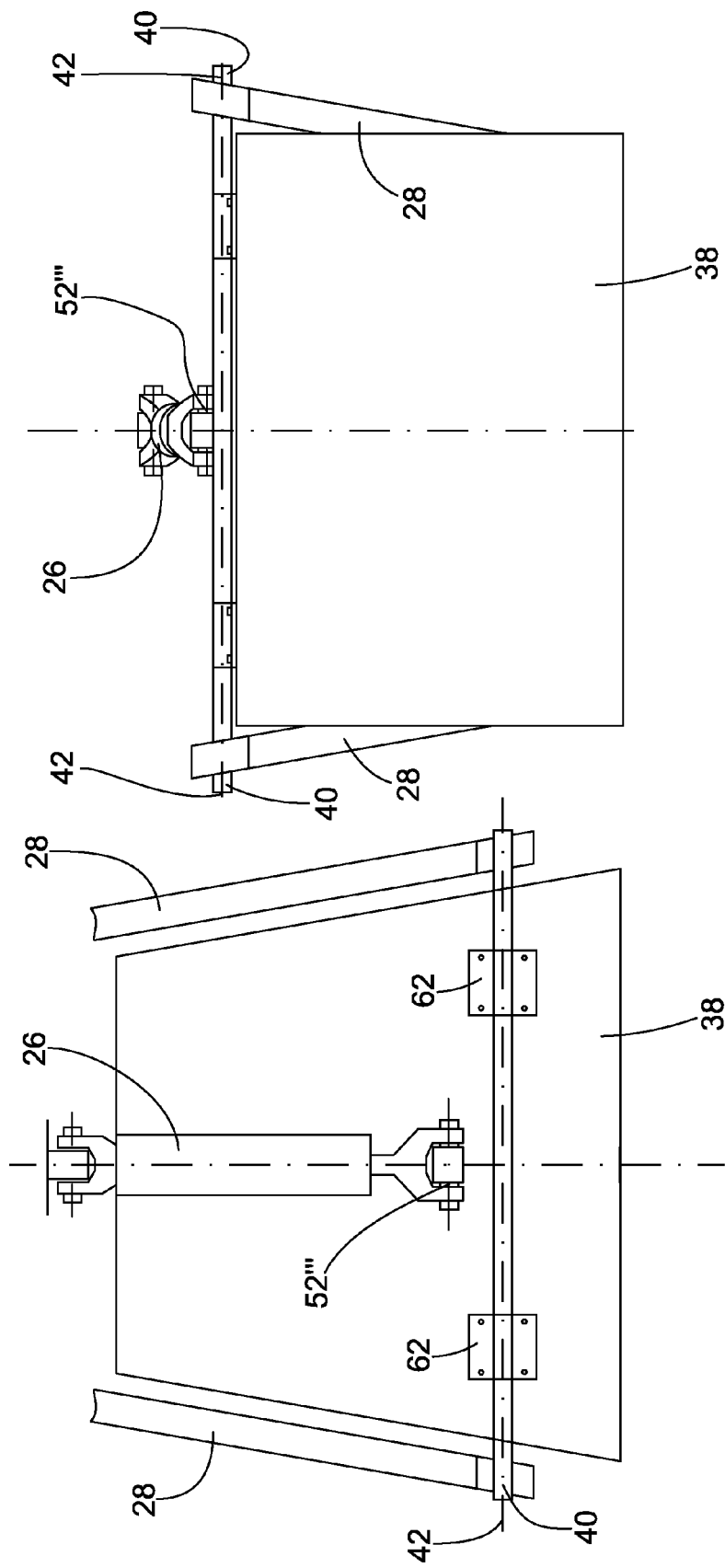

AGRICULTURAL VEHICLE BALANCING SYSTEM

FIELD OF THE INVENTION

The present invention relates to a balancing system for an agricultural vehicle.

BACKGROUND OF THE INVENTION

It is known practice that agricultural tractors when operating with heavy attached implements attached to the rear, such as, for example, a plow, are equipped with an additional weight or an additional mass or a balance weight at the forward end of the tractor. Such a balancing system with a balance weight can be performed with a massive single balance weight (for example 900 kg) or several smaller balance weights (of, for example, 50 kg each). Usually the balance weights are arranged at a location provided for it at the forward part of the vehicle body and rigidly installed at that location. This is usually connected with considerable expense and cannot be accomplished without costly additional equipment (fork lift, crane, lifting arrangement, etc.), to assemble or disassemble the balance weights, so that the balance weights offer only few or costly possibilities, of varying the additional load applied to the front axle or to conform optimally to varying conditions or operating conditions. As a practical matter, this leads to operation with the same balance weight or the same added mass and that thereby the tractor is not optimally balanced along the way. Moreover, this can be accompanied by other disadvantages: basically higher fuel consumption as well as a lower capacity for added load with extremely heavy balance weights. An increased vehicle length and reduced mobility due to the attached balance weights that are arranged at the forward part of the vehicle body. A relatively high center of gravity of the vehicle since the balance weight is arranged, as a rule, ahead of the vehicle body and above the front axle. A high danger potential for accidents connected to it during operation on public roads, especially for passenger vehicles, since the balance weight is attached at a relative high level as compared to a passenger vehicle, so that these either roll over or that unprotected areas (windows, roof) collide with the balance weight.

Solutions are known in the state of the art with which an attempt is made to solve this problem. In that way, it is known practice, for example, to apply a front hydraulic solution, particularly a front hitch, in which an additional weight or a balance weight can be applied simply and easily for balancing if necessary. Such front hydraulic arrangements however only provide a fixed location for the balance weight, so that the aforementioned problems are considered only partially.

It is also known practice, furthermore, to apply a balancing by a balance weight or an additional weight and to make this conform to the required or the prevailing operating conditions, so that the arrangement of the weight on the vehicle is variable and in particular a movement of the weight in the longitudinal direction of the vehicle is possible.

Such an adjustable arrangement on an agricultural tractor is disclosed by U.S. Pat. No. 4,322,094A1. Here a balance weight is shifted hydraulically in the longitudinal direction; it is connected to the plate located on the underside of the vehicle body. This arrangement is connected with a high construction cost and solves the aforementioned problems only partially.

In that way, DE 3223990 A1 discloses an agricultural tractor, that is provided with a hydraulically driven parallelogram linkage at the side of the vehicle body, with which a supplemental weight can be moved ahead of the vehicle body primarily in the longitudinal direction from an upper position close to the vehicle to a lower position more distant from the vehicle. The disadvantage here is that the center of gravity of the supplemental weight in its position close to the vehicle is located relatively high due to the configuration of the linkage. Moreover, the arrangement occupies much space at the side of the vehicle to a great disadvantage.

In addition DE 10 2005 040 954 A1 discloses a balancing system on an agricultural vehicle, in which a balance weight can be shifted from a position close to the vehicle to a position distant from the vehicle by means of a front hitch. The disadvantage here is that the balance weight is located at a relatively high center of gravity in its position close to the vehicle, which lies above the front axle of the vehicle. So that here too the aforementioned disadvantages are not overcome.

SUMMARY OF THE INVENTION

Accordingly, an object of this invention is to provide a vehicle balancing system which overcomes the aforementioned problems.

These objects are achieved by the present invention, wherein a balancing system is configured in so that the center of gravity of the balance weight is below the pivot axis in the position close to the vehicle and pivoting devices are provided by means of which the balance weight can be pivoted about the pivot axis in such a way that it can be moved from the position close to the vehicle to a position distant from the vehicle, where the balance weight is located in the position close to the vehicle at a lower location of its center of gravity than in the position more distant from the vehicle. A balancing system, according to the invention, makes it possible to adjust the supplementary weight applied to the front wheels of the vehicle by moving it in the longitudinal direction and to adjust it optimally to the existing operating conditions. In that way an altogether lower balancing mass can be applied for the balancing. Since the balance weight can be moved it can be brought into an intermediate position very simply. This simplifies the removal or disassembly of the balance weight as well as the application or the mounting of the balance weight. Preferably the balancing system can be coupled to a three point implement hitch of an agricultural tractor. This permits a simple handling of the balance weight where the balancing system can be engaged by the mounting pins provided on the balance weight and engaged by the lower steering arms of the three point implement hitch. The position of the center of gravity of the balance weight is arranged below the pivot axis defined by attachment pins of the balance weight; this makes it possible by pivoting the balance weight forward about the pivot axis to shift the weight from a lower position close to the vehicle to a higher position more distant from the vehicle. Thereby higher loads are possible for example for operation on public roads without any greater additional cost and lower overall fuel consumption is attained. In addition due to the lower position of the center of gravity of the balance weight in the position close to the vehicle the protection of passengers and the vehicle is increased since obstacles during collisions, for example, during an accident with a passenger vehicle are collided with in a lower position of the center of gravity so that a roll-over can also be avoided. The position of the balance weight close to the vehicle provides a maximum mobility of the vehicle since the balance weight does not extend as far in the forward direction. In the position of the balance weight close to the vehicle with lower center of gravity of the balance weight, the safety of operating the vehicle is also increased in the case of operating around a curve or along a side slope.

Preferably the pivoting devices are provided with an engagement bearing at the balance weight, to which a steering arm that can be shifted in the longitudinal direction can be coupled, in such a way that by a change in length of the steering arm the balance weight can be pivoted. By a change in length of the length-adjustable steering arm the engagement bearing on the balance weight is shifted at a fixed distance from the engagement pin or to the pivot axis, so that a rotational movement of the balance weight about the pivot axis is initiated. Thereby the center of gravity of the balance weight is shifted at a fixed distance (radius) from the pivot axis, so that when the engagement pin is engaged, for example, if these are engaged by the lower steering arms of a three point implement hitch, then a shift of the center of gravity of the balance weight occurs from a lower position close to the vehicle to a higher position further away from the vehicle.

In a preferred embodiment of the invention the take-up bearing of the balancing system is configured in such a way that a steering arm of a three-point implement hitch that can be adjusted in length, particularly a so-called upper steering arm, can be coupled to it. This makes it possible that the aforementioned balancing system is compatible with a three-point implement hitch of the usual configuration and can be coupled to it. When the balancing system is coupled a rotational movement of the balance weight about the pivot axis is initiated by an adjustment of the upper steering arm in its length, as already described above. Here the pivot axis is defined by the attachment pins at the side that are retained by the lower steering arms of the three point implement hitch.

In a further preferred embodiment the pivoting devices are provided with at least one sheet metal steering device with at least three connecting points and a steering arm, adjustable in length in addition to the take-up bearing at the balance weight, where the sheet metal steering device is connected at a (first) connection point by means of the steering arm that is adjustable in length and is connected so as to rotate with the take-up bearing and to a (second) further connecting point coaxially to the axis of rotation and free to rotate with the balance weight, in such a way that a pivoting of the balance weight relative to the sheet metal steering device can be attained by a change in the length of the steering arm that is adjustable in length, where the sheet metal steering device can be coupled to a further (third) connecting point to the steering arm of a three point implement hitch, preferably the upper steering arm. Since the second connection point of the sheet metal steering device is arranged coaxially to the pivot axis or to the take-up pin, during the coupling of the balance arrangement of a three point implement hitch the position of the second connecting point is established or provided as input to the take up pin of the balancing system. As long as these (are adjustable in height or in length) are configured as adjustable, by readjusting the lower steering arms of the pivot axis of the balancing system and with it the position of the second connecting point can be varied, or readjusted, or shifted. Moreover, in the case of coupling of the balancing system to a three point implement hitch the position of the third connecting point of the sheet metal steering device is also established by the steering arm of the three point implement hitch (in particular, the upper steering arm), where the position of the third connecting point can be varied or repositioned or adjusted by readjusting the lower steering arms. Thereby the positions of the second and third connecting points (and thereby also the position of the first connecting point) can be defined, varied or adjusted or shifted when the balancing system is coupled by adjusting the lower steering arm relative to a vehicle frame equipped with a three point implement hitch. Moreover, it is also possible to configure the steering arm connected to the third connecting point as variable in length, in order to create additional possibilities for the positions of the connecting points of the sheet metal steering device.

Preferably, the steering arm(s) that can be adjusted in length is (or are) configured as an actuator, particularly as a hydraulic cylinder. However, it is also conceivable to select another method of actuation, for example, an electric, mechanical or pneumatic method of actuation of a cylinder. In that way, the actuator can be configured as an electric motor, for example, a spindle motor. A corresponding arrangement with a rope pull is also conceivable in order to configure the actuator purely mechanically. Preferably the actuator is connected in such a way that by actuating the actuator in interplay of the balancing system with the steering arms of the three point implement hitch a guided movement of the balance weight can be performed. Thereby an assurance is provided for an operator to attain a variation, or shifting or readjustment of the balance weight by remote control as well as during changing operating conditions and can react rapidly so as to optimize the balancing system.

In a preferred embodiment of the invention the pivoting devices extend at least partially through a recess provided on the balance weight, where the recess is preferably configured as central to a central longitudinal axis of the vehicle or the vehicle frame. Depending on the configuration the pivoting devices can also extend at least partially through a recess that is arranged on the vehicle body and/or on a vehicle frame and/or a take up arrangement arranged on the vehicle body or vehicle frame, where this is also configured correspondingly centrally. The recess or recesses permit a most compact configuration of the pivoting devices, particularly the sheet metal steering device in interaction with the steering arm(s) that are adjustable in length, since the pivoting devices perform their pivoting motion generally within the recess. The central arrangement of the recess provides for a most possibly symmetrical distribution of the balance weight or the entire balancing system.

Moreover, a further embodiment of the invention includes an agricultural vehicle, particularly tractor, with a vehicle body or a vehicle frame, and a three point implement hitch fastened to the forward part of the vehicle body and a balancing system, where the balancing system is provided with a balance weight with attachment pins at the sides, that are oriented coaxially to a common pivot axis, where the balancing system is engaged by the attachment pins of the lower steering arms of the three point implement hitch and the balance weight can be shifted from a position close to the vehicle to a position distant from the vehicle relative to the center of gravity of the balance weight. As previously defined above, the balancing system is configured in such a way that the center of gravity of the balance weight is located underneath the pivot axis in the position close to the vehicle and pivoting devices are provided by means of which the balance weight can be pivoted about the pivot axis in such a way that it can be brought from the position close to the vehicle to a position distant from the vehicle, where the balance weight is located at a lower center of gravity in its position close to the vehicle than in the position distant from the vehicle.

Further preferred embodiments of an agricultural vehicle, particularly a tractor, are provided corresponding to embodiments of a balancing system already described above and are to be considered here.

Moreover, the balance weight may be configured in such a way that it is arranged at least partially underneath the vehicle body in its position close to the vehicle. Thereby, for example, a further center of gravity relocation downward can be attained and, on the other hand, the projection of the balance weight ahead of the vehicle body can be reduced, whereby the aforementioned advantages relative to a lower center of gravity and for a maximum mobility can be expressed even more strongly.

In its position distant from the vehicle the balance weight can be arranged, for example, at the same height as the vehicle body and ahead of the vehicle body. Thereby a greater ground clearance is assured for operation on a field and a maximum load increase attained at the front axle.

In a preferred embodiment of the invention the steering arms of the balancing system or of the three point implement hitch can be immobilized by means of an immobilizing arrangement in the adjustable positions. This provides the assurance that the balance weight is retained safely and preferably without any play in a position close to the vehicle as well as a position distant from the vehicle. Here it is also possible to provide positions between the position close to the vehicle and the position distant from the vehicle so that they can be immobilized also, so that a balancing with a fine calibration can be performed. Preferably the immobilizing arrangement includes the steering arm or arms of the pivoting arrangement or of the three point implement hitch that can be immobilized in a certain position hydraulically or pneumatically, or mechanically, or electrically, that is they can be retained or blocked, so that the adjustable steering arms remain in a retained or a blocked position. Such an immobilizing arrangement or blocking arrangement can be applied to a steering arm that is adjustable in its length that includes a hydraulic actuator, and performed for example, hydraulically. An electrically operated spindle motor or stepper motor operating as an actuator can, for example, remain in its position and block the steering arm arrangement by corresponding electronic control signals.

BRIEF DESCRIPTION OF THE DRAWINGS

FIG. 5 is a schematic plan view of the balancing system of FIGS. 2-4, coupled to a three point implement hitch in its base position;

FIG. 6 is a schematic front view of the balancing system of FIGS. 2-5 coupled to a three point implement hitch in the base position;

FIG. 10 is a schematic plan view of the balancing system according to FIGS. 7 through 9, coupled to a three point implement hitch in the base position;

FIG. 11 is a schematic front view of the balance system of FIGS. 7 through 10, coupled to a three point implement hitch in the base position;

FIG. 14 is a schematic plan view of the balancing system of FIG. 12 or 13, coupled to a three point implement hitch in the base position;

FIG. 15 is a schematic front view of the balancing system of FIGS. 12 through 14, coupled to a three point implement hitch in the base position;

FIG. 18 is a schematic plan view of the balancing system of FIG. 16 or 17, coupled to the three point implement hitch in the base position; and FIG. 19 a schematic front view of the balancing system of FIGS. 16 through 18, coupled to the three point implement hitch in the base position.

DESCRIPTION OF THE PREFERRED EMBODIMENT

Figure 1:
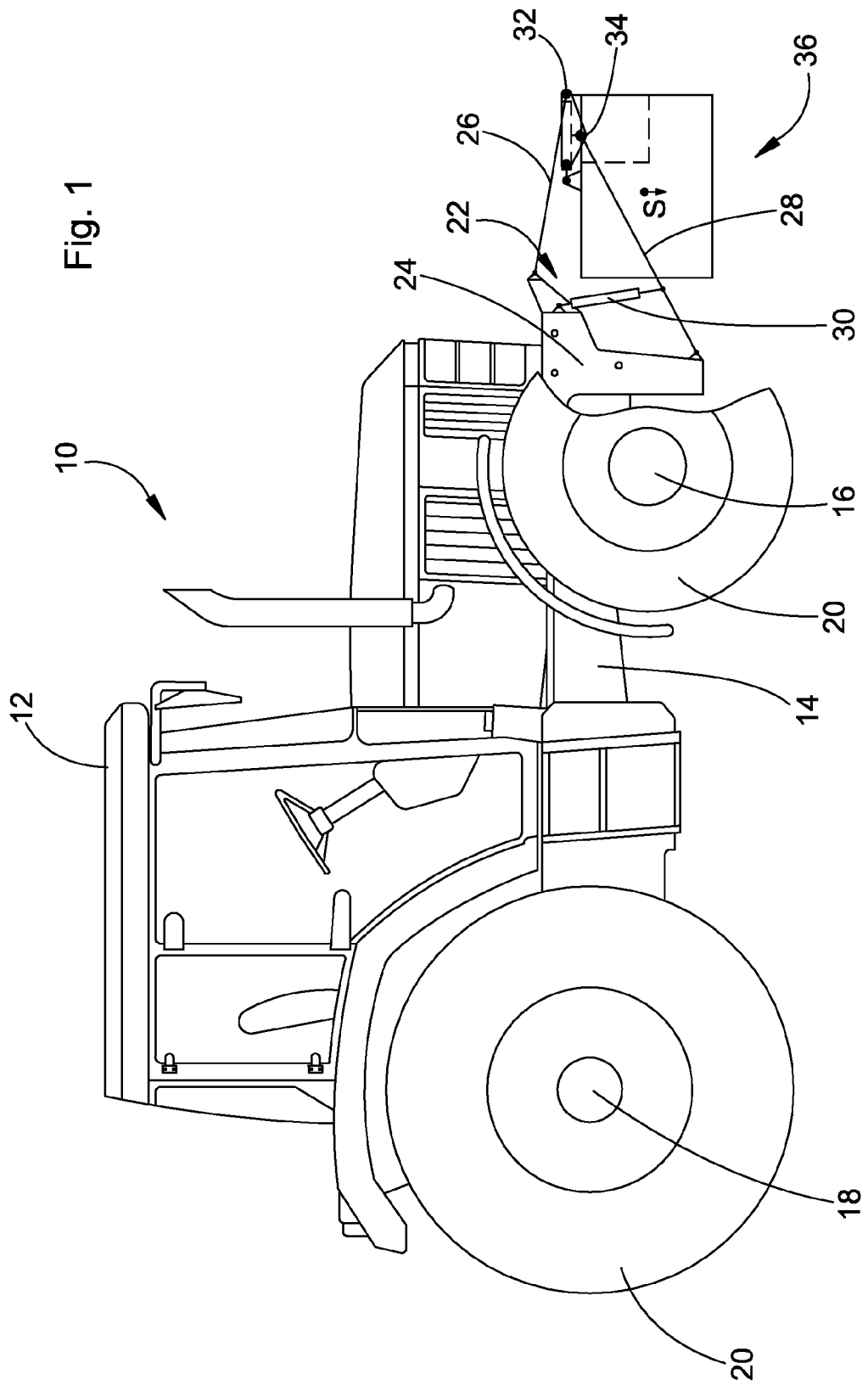
FIG. 1 is a schematic side view of an agricultural vehicle with a balancing system coupled to a front-three point implement hitch.

FIG. 1 shows an agricultural vehicle 10 in the form of a tractor 12. The tractor 12 is provided with a vehicle frame 14 that is carried by wheels 20 suspended on front axle 16 and a rear axle 18. A front-three point implement hitch 22 is arranged at the forward end of the vehicle frame 14 at the front side of the vehicle 10, that is fastened to the vehicle frame 14 by means of an attachment frame 24 so it can be removed, in particular it can be bolted to the vehicle frame and extends to the front beyond the vehicle frame 14.

The front three point implement hitch 22 is provided with an upper links 26 arranged in the upper region of the three point implement hitch 22 central to the vehicle 10, as well as two lower links 28 arranged at the side of the upper links 26 in the lower region of the three point implement hitch 22, each of which is connected in bearings to the attachment frame 24. A lift strut 30 extends in each case between the lower links 28 and the attachment frame 22, that retain the lower links 28 in a desired pivoted position to the attachment frame 221. The lift struts 30 may be configured as hydraulic cylinders, so that the lower links 28 can be pivoted hydraulically in height, or pivoted in angle, or pivoted. The upper steering arms and lower steering arms 26, 28 are provided with catch hooks 34 or coupling joints 32, to which an operating arrangement designed for the three point implement hitch in the form of a balancing system 36, according to the invention, can be attached.

In the following, four different embodiments of a balancing system 36, according to the invention, are described on the basis of FIGS. 2 through 19.

The balancing systems 36 described in the following are provided in each case with a balance weight 38, that is engaged by the lower steering arms of the three point implement hitch over take-up pins 40 extending sideways (sideways in the sense of transverse to the vehicle longitudinal axis) so as to pivot by means of pivoting devices about a pivot axis 42, defined by the take-up pins 40 or is coupled to the three point implement hitch 22. The pivot axis 42 is arranged on the balance weight 38 in such a way that in a base position of the balancing system 38 (retracted, close to a vehicle, lower position of the balance weight) the pivot axis is located above and ahead of the center of gravity S of the balance weight 38 in the direction of operation.

In the embodiment shown in FIGS. 2 through 6 the pivoting devices include a preferable triangular sheet metal steering device 44 that is provided with a first, second and third attachment point, 46, 48, and 50 at its corners. Moreover, the pivoting devices include a take-up bearing 52 on the balance weight 38, as well as a steering arm 54. In this embodiment the take-up bearing 52 of the balance weight 38 is arranged on the upper side of the balance weight 38 where other arrangements would also be conceivable. The steering arm 54 extends and is cinematically effective between the take—up bearing 52 and the first connecting point 46 of the sheet metal steering device 44, it is connected on one side, free to pivot, to the first connecting point 46 of the sheet metal steering device 44 and on its other side it is connected, free to pivot, to the take-up bearing 52 on the balance weight 38. Moreover, the steering arm 54 is configured so as to be adjustable in length, preferably as a hydraulic cylinder, where the hydraulic cylinder is connected on its cylinder side to the sheet metal steering device 44 at the connecting point 46 and on its rod side to the take-up bearing 52, free to pivot. The second connecting point 48 of the sheet metal steering device 44 is arranged centrally in the balance weight 38 and coaxially to the pivot axis 42 and connects the balance weight 38, free to pivot, with the sheet metal steering device 44. Here the sheet metal steering device 44 is connected directly over a connecting pin 46, free to pivot, with the balance weight 38, through which simultaneously the take-up pins 40 are also configured. It is also conceivable throughout this description to configure the connecting pin 56 and the take-up pins 40 separately from each other. The configuration selected here includes a rod extending over the entire width of the balance weight 38 that simultaneously forms take-up pins 40, pivot axis 42 and connecting pin 56, and is intended to merely represent a possible embodiment. The rod extending over the entire balance weight 38, which simultaneously forms take-up pins 40, pivot axis 42 and connecting pins 56 is fastened to the balance weight 38 by attaching brackets 62 on the balance weight 38. It is also conceivable that corresponding rods or journals that can be used as take-up pins 40 are directly cast or forged or welded or are provided in recesses for inserted journals. At its third connecting point 50 the sheet metal steering device 44 is connected, free to pivot, with the connecting point 32 of the upper links 26. A connecting pin 58 is used as a connecting device that connects the upper links 26 and the sheet metal steering device 44 with each other, free to pivot. The upper links 26 is configured in the shape of a fork; see FIGS. 5 and 6, where the forked end is connected to the sheet metal steering device 44. The sheet metal steering device 44 is provided with two opposite sheet metal steering device sides 44', 44", that are arranged on the inner side of the forked end of the upper links 26. Thereby the steering arm 54 extends along the inner side of the forked end of the upper links 26 between the two halves of the sheet metal steering device 44', 44". The forked end of the upper links 26 is provided, so that the steering arm 54 as well as the sheet metal steering device 44 can pivot away when the balancing system 36 is actuated, since it occupies a corresponding movement space. In order to assure the necessary movement space even in the area of the balance weight 38, the latter is provided with a recess 60, that also extends symmetrically about a vehicle longitudinal central axis (that is centrally) into the interior of the balance weight 36. The recess 60 is dimensioned in such a way that upon pivoting of the balance weight 38 or upon actuation of the balancing system 36 the sheet metal steering device 44 or 44' and 44" as well as the upper links 26 or its forked end can move freely in the recess 60.

The balance weight 38 and the three point implement hitch 22 are configured in such a way or made to conform to the configuration of the vehicle 10, in such a way that the balance weight 38 in its position close to the vehicle can be moved or positioned as far as possible underneath the vehicle frame 14 and as close as possible to the front axle 16 of the vehicle 10. In the upper position distant from the vehicle the balance weight 38 is in a position with a significantly higher center of gravity than the lower position, close to the vehicle.

The steering arm 54 may be configured as an actuator that can be blocked or is a self locking actuator, so that no separate immobilizing arrangement for the balancing system 36 is required, but rather that the immobilizing is performed hydraulically, where a corresponding hydraulic control arrangement is provided for a steering arm 54 configured as a hydraulic cylinder, so that a flow of hydraulic fluid from one or more chambers of the hydraulic cylinder can be blocked by one or more blocking valves. For example, a spindle motor (not shown) could also be used as an actuator that is provided with a self locking thread.

Figure 3:
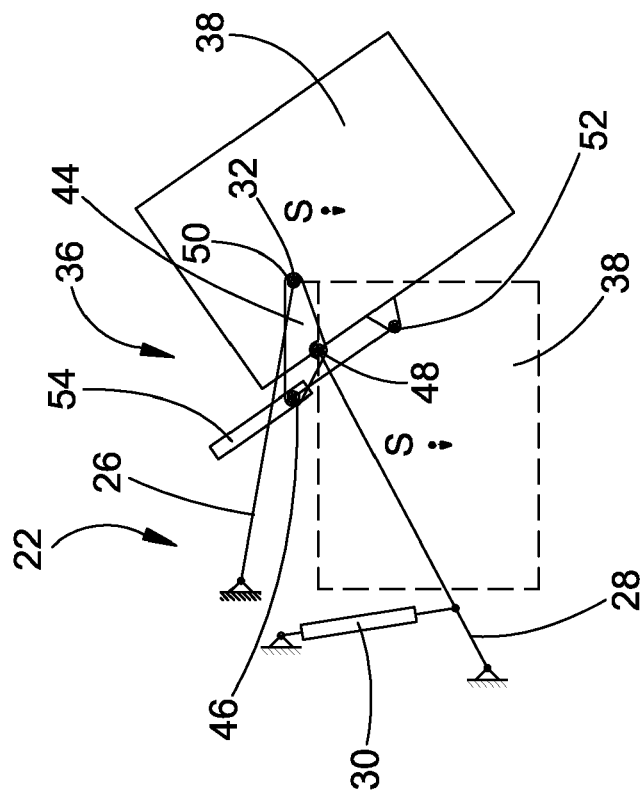
FIG. 3 is a schematic side view of the balancing system of FIG. 2 coupled to a three point implement hitch in a center position.
Figure 2:
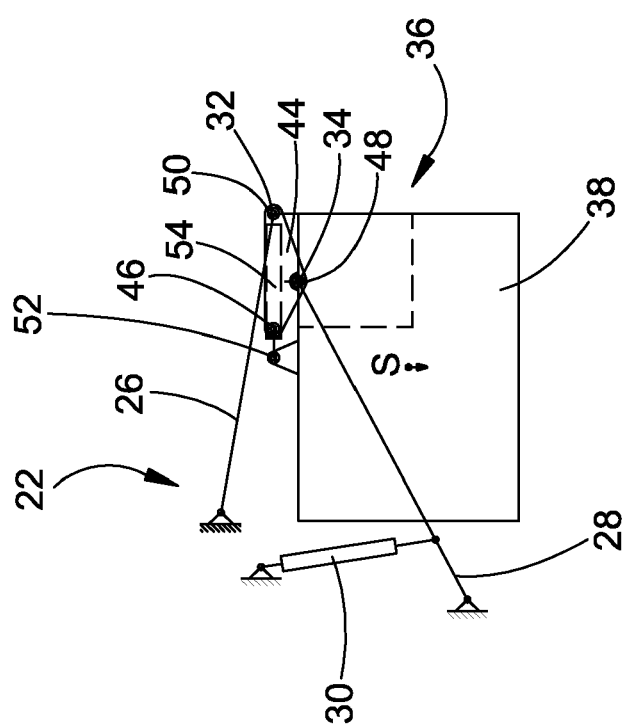
FIG. 2 is a schematic side view of a first embodiment according to the invention of a balancing system coupled to a three-point implement hitch in a base position.
Figure 4:
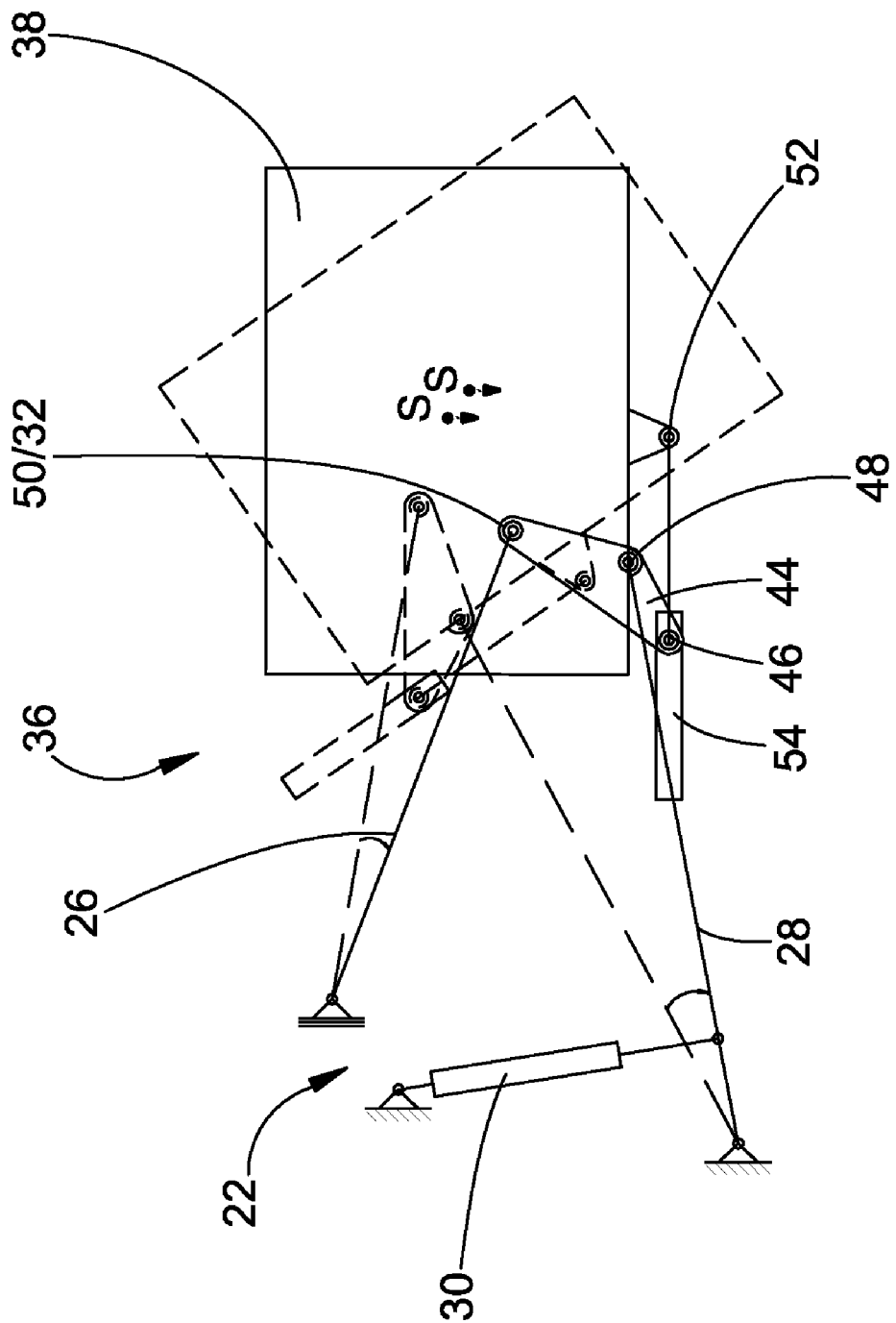
FIG. 4 is a schematic side view of the balancing system of FIG. 2 coupled to a three point implement hitch in an end position.

As is shown in FIGS. 2 through 4, the balancing system 36 can be operated in two steps, in that, at first, the steering arm 54 that is adjustable in length, is extended. This leads to the condition that the balance weight 38 is pivoted about its pivot axis 42 until the steering arm 54 has taken up its full length. The balance weight 38 is thereby (depending on the arrangement of the upper links 26, lower steering arm 28, sheet metal steering device 44 and steering arm 54) pivoted about approximately 120°, where the center of gravity S of the balance weight 38 is clearly shifted upward and to the front. In this first actuation step, the upper links 26, the lower steering arm 28 and the sheet metal steering device 44 are generally retained in these positions and for their part retain the pivot axis as fixed. The second step is only initiated (see FIG. 4) at first by actuation of the lift struts 30 that are configured as lift cylinders (extension of the lift cylinders), in that the lower links 28 are moved downward. This leads to the fact that the second and third connection points of the sheet metal steering device are shifted in space and a rotation of the sheet metal steering device 44 and an additional pivoting of the balance weight 38 connected thereto is initiated, which is coupled over the steering arm 54 and the take-up bearing 52 to the sheet metal steering device 44. A further shift of the center of gravity S of the balance weight 38 can be attained by a second movement step upward, that results in additional ground clearance. As a result after complete extension of the steering arm 54 that can be adjusted in length and after extension of the lift struts 30 configured as lift cylinders the balance weight 38 has performed a pivot angle of approximately 180°, where the balance weight 38 is located at a lower position of its center of gravity when it is close to the vehicle than in the position distant from the vehicle. The steps of movement are not related to each other in their sequence and can be performed independently of each other, so that a repositioning of the balance weight 38 can be performed most appropriately to the particular application, in order to undertake the best possible optimized, stepless balancing or arrangement of the pivot center S of the balance weight 38.

Figure 8:
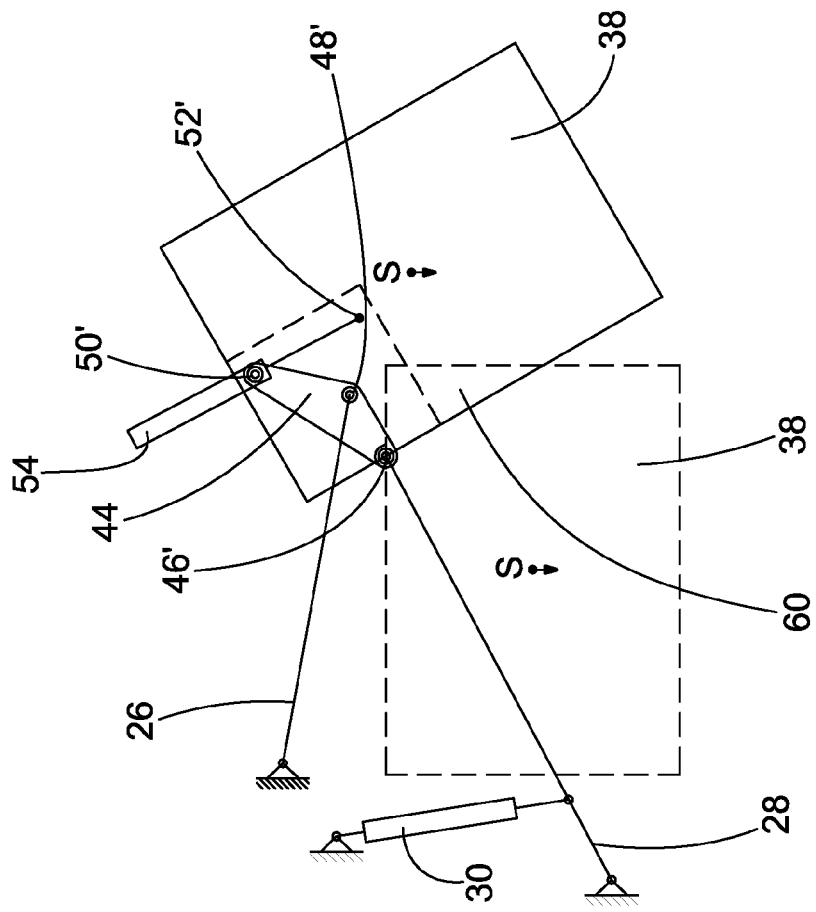
FIG. 8 is a schematic side view of the balancing system of FIG. 7 coupled to a three point implement hitch in a center position.
Figure 7:
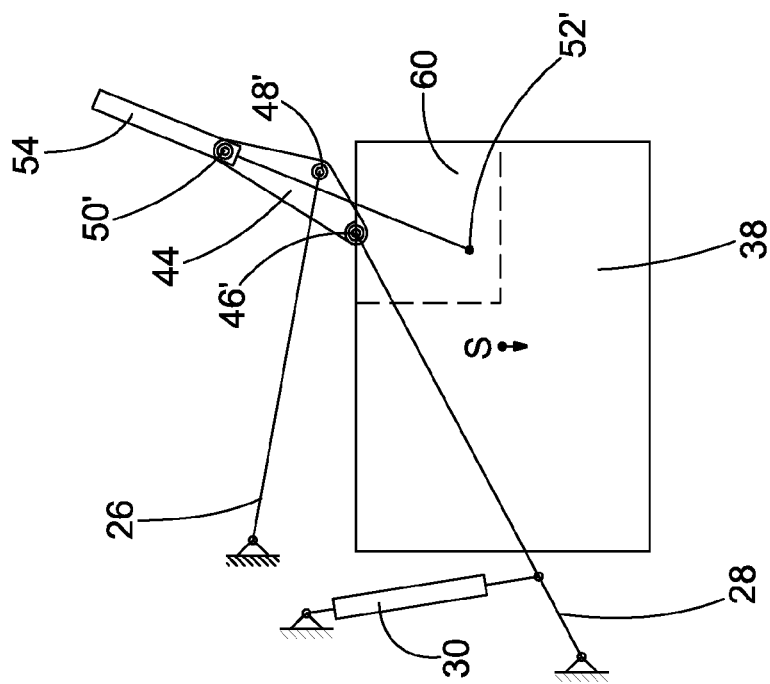
FIG. 7 is a schematic side view of a second embodiment of the invention of a balancing system coupled to a three point implement hitch in a base position.
Figure 9:
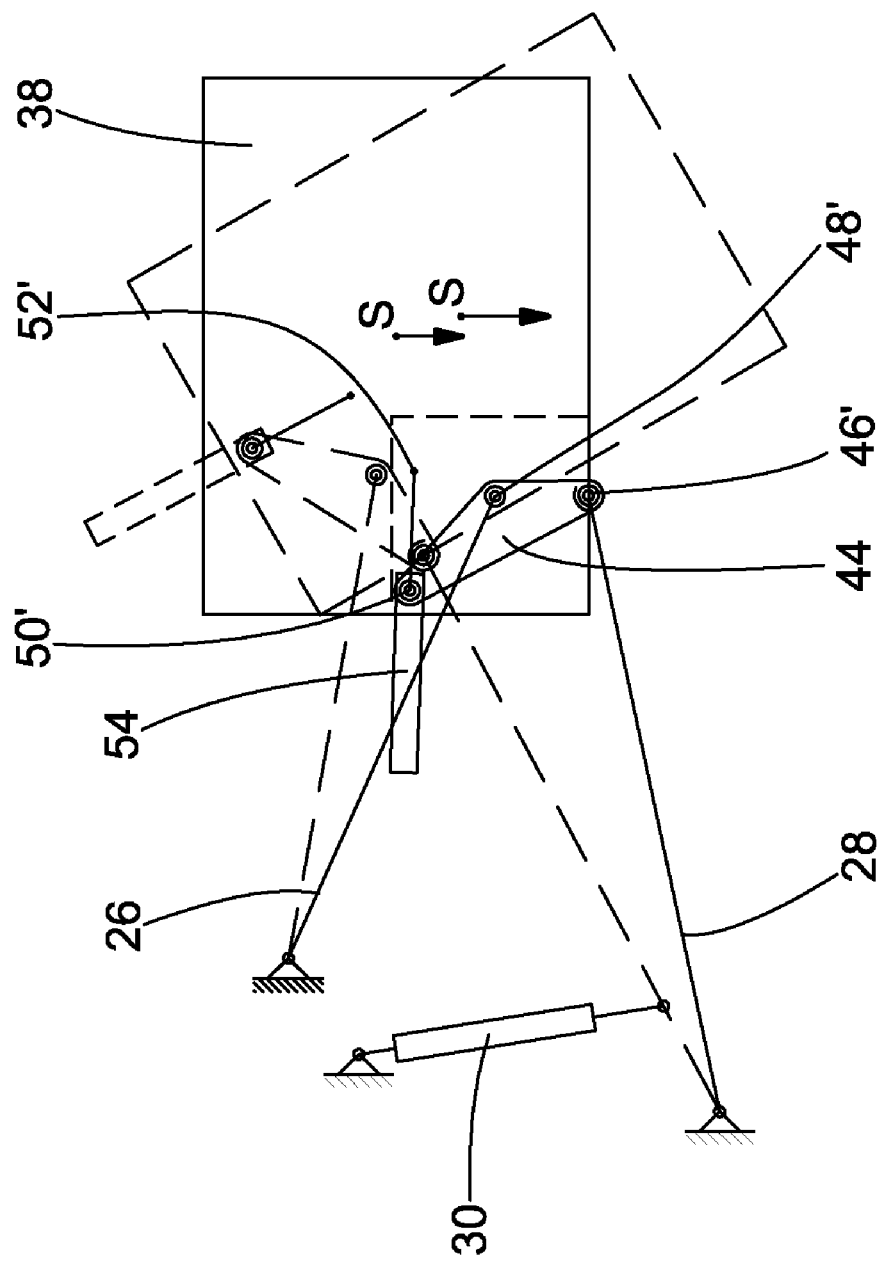
FIG. 9 is a schematic side view of the balancing system of FIG. 7 or 8, coupled to a three point implement hitch in an end position.

A second embodiment is described on the basis of FIGS. 7 through 11, where here the sheet metal steering device 44 and the steering arm 54' that can be varied in its length are provided with a different arrangement from that of the first embodiment. The connecting points 46, 48, 50 of the sheet metal steering device 44 as well as the take-up bearing 52 of the balance weight 38 are identified correspondingly with 46', 48', 50', or 52'. Otherwise the above embodiments also apply to the second embodiment. The first connecting point 46' of the sheet metal steering device 44, see FIG. 7 through 9, is arranged here at the center of the balance weight 38 and coaxially to the pivot axis 42 and connects the balance weight 38 to the sheet metal steering device 44, free to pivot. Moreover, the second connecting point 48' is connected to the upper links 26 of the three point implement hitch 22. The third connecting point 50' of the sheet metal steering device 44 is connected with the steering arm 54 that is adjustable in length, which connects the balance weight 38 to the take-up bearing 52' here also to the sheet metal steering device 44. The take-up bearing 52' however in this case is arranged within the balance weight 38 in the area of the recess 60. As can be seen in FIGS. 7 through 9 the steering arm 54 thereby is located in its base position with an extended position. The readjustment of the balancing system 36 or of the balance weight 38 is here also performed in two steps. On the basis of the arrangement of the sheet metal steering device 44, as opposed to the first embodiment, (or the connecting points 46', 48', 50'), of the take-up bearing 52' and the steering arm 54, a readjustment of the balancing system 36 is attained in the first step by retracting the steering arm 54, whereby the balance weight 38 is pivoted about the pivot axis 42. Here too in a similar manner to the embodiment of the FIGS. 2 through 6 a first step pivoting of the balance weight 38 through approximately 120° is attained (see FIG. 8). By extending the lift struts 30 a further repositioning of the balancing system 36 can be attained in the same manner and with the same effect as in the above embodiment (see FIG. 9), so that after complete retraction of the steering arm 54 that is adjustable in length, and after extending the lift strut 30 that was configured as lift cylinders, the balance weight 38 has performed a pivot angle of approximately 180° where the balance weight is located at a lower center of gravity in its position close to the vehicle than in a position distant from the vehicle.

Figure 13:
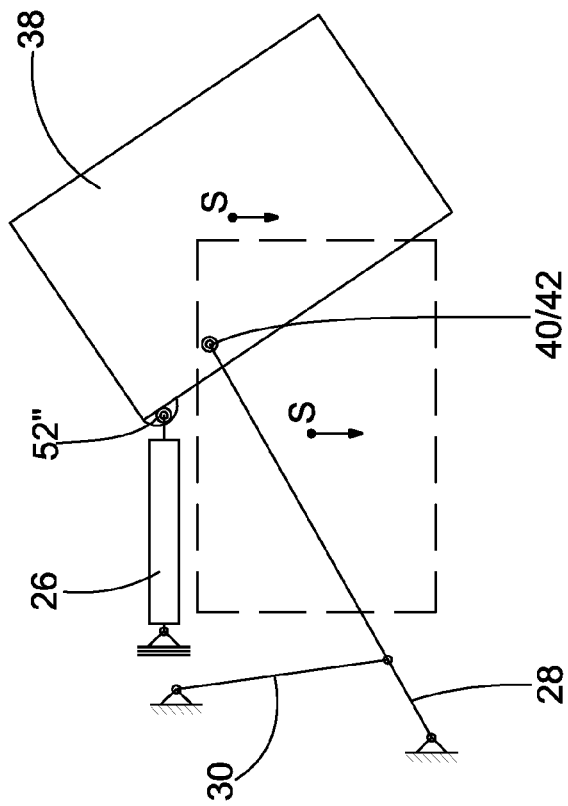
FIG. 13 is a schematic side view of the balancing system of FIG. 12 coupled to a three point implement hitch in an end position.
Figure 12:
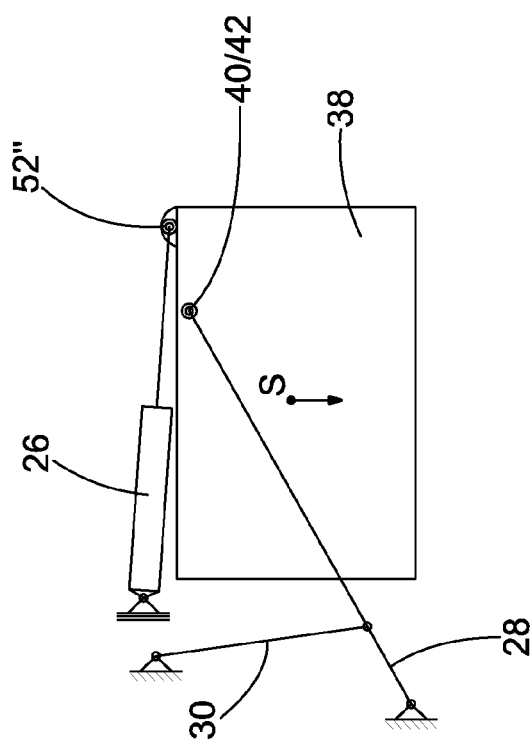
FIG. 12 is a schematic side view of a third embodiment of the balancing system coupled to a three point implement hitch in a base position.
Figure 17:
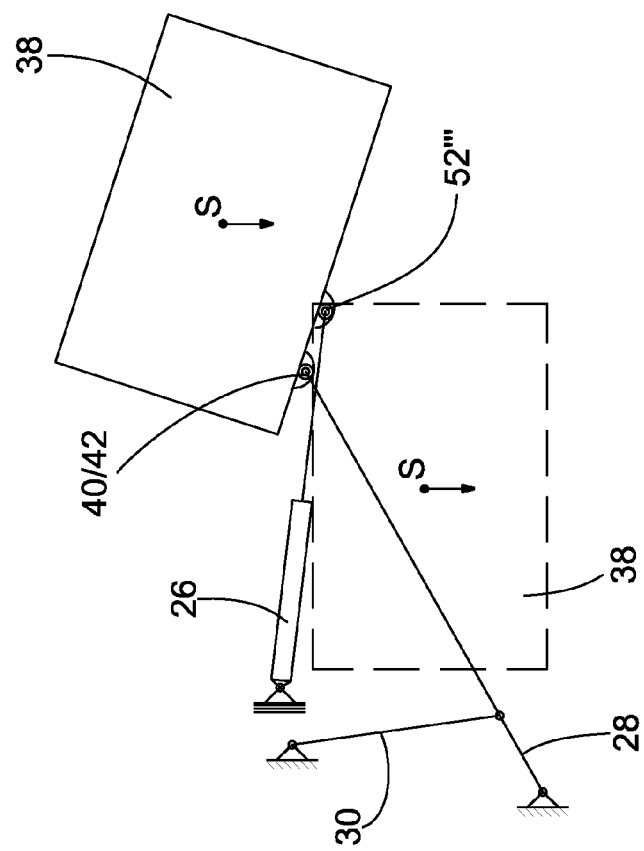
FIG. 17 is a schematic side view of the balancing system of FIG. 16 coupled to the three point implement hitch in an end position.

A third embodiment is described on the basis of FIGS. 12 to 15, where here a one step adjustment of the balancing system 36 is configured. This is attained by the omission of the sheet metal steering device 44 shown in the first and second embodiments, so that no further pivoting of the balance weight 38 can be attained by lowering or raising the lower steering arms. Here the upper links 26 is configured as an arm adjustable in length, for example, a hydraulic cylinder or corresponding to one of the alternatives cited in the above embodiments (stepper motor, etc). Without the sheet metal steering device 44 the connecting points 46, 48, 50 or 46', 48', 50' are omitted. The arrangement of the pivot shaft 42 or the take-up pins 40 that define the pivot shaft 42 is performed corresponding to the above embodiments. On the other hand the take-up bearing 52" is arranged on the upper side of the balance weight 38 ahead of the pivot shaft 42 in the direction of operation and is connected to the upper links 26, where the upper steering arm in its base position is in an extended position (FIG. 12). The balance weight 38 is now pivoted about the pivot axis 42 by retracting the upper links 26 (FIG. 13), where the center of gravity S of the balance weight 38 is repositioned toward the front and upward, as shown in FIG. 13.

Figure 16:
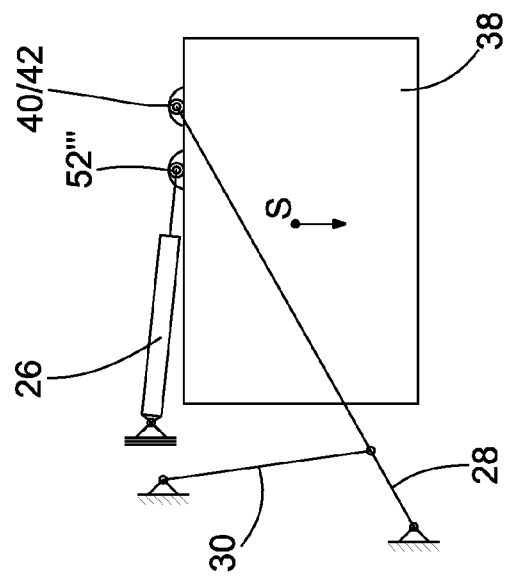
FIG. 16 is a schematic side view of a fourth embodiment of the balancing system coupled to a three point implement hitch in a base position.

A fourth embodiment is described on the basis of FIGS. 16 through 19, where here a one-step adjustment of the balancing system 36 is also performed. The fourth embodiment differs from the preceding (third) embodiment only in the fact that here the take-up bearing 52''' is arranged in the direction of operation behind the pivot shaft 42 on the upper side of the balance weight 38 and the upper steering arm in its base position is in a retracted position (FIG. 16). By extending the upper links 26 (FIG. 17) a pivoting of the balance weight 38 is now performed about the pivot axis 42, where the center of gravity S of the balance weight 38 is repositioned to the front and upward, as is shown clearly in FIG. 17.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A balancing system for an agricultural vehicle, the balancing system having a balance weight and take-up pins which extend from sides of the weight and which are oriented coaxially along a common pivot axis, the take-up pins allowing the balancing system to be taken up by lower links of a three point implement hitch, and the balance weight having a center of gravity S which is movable from a first position close to the vehicle to a second position distant from the vehicle, characterized by:

the position of the center of gravity of the balance weight is located underneath the pivot axis in the first position; and the balancing system including pivoting devices for pivoting the balance weight about the pivot axis so that the balance weight is moved from a the first position to the second position, and the center of gravity is lower when in the first position, the pivoting devices include a take-up bearing at the balance weight, to which an adjustable length steering link can be coupled so that changing a length of the steering link causes a pivoting of the balance weight, and each pivoting device comprises a sheet metal steering device with at least three connecting points and an adjustable length steering arm, the sheet metal steering device being pivotally connected to the steering arm, to the take-up bearing and to the balance weight, so that, that changing a length of the steering arm causes the balance weight to pivot relative to the sheet metal steering device, and the sheet metal steering device can be coupled at a further connecting point to the implement hitch.

2. The balancing system of claim 1, wherein:
the adjustable length steering link is part of the three point implement hitch.

3. The balancing system of claim 1, wherein:
the steering arm is a hydraulic cylinder.

4. The balancing system of claim 1, wherein:
the pivoting devices extend at least partially through a recess provided on the balance weight, and the recess is oriented centrally to a central longitudinal axis of the vehicle.

* * * * *